2 Sheets—Sheet 1.
I. I. GREENOUGH.
Sewing Machine.
No. 352.
Reissued Feb. 12, 1856.
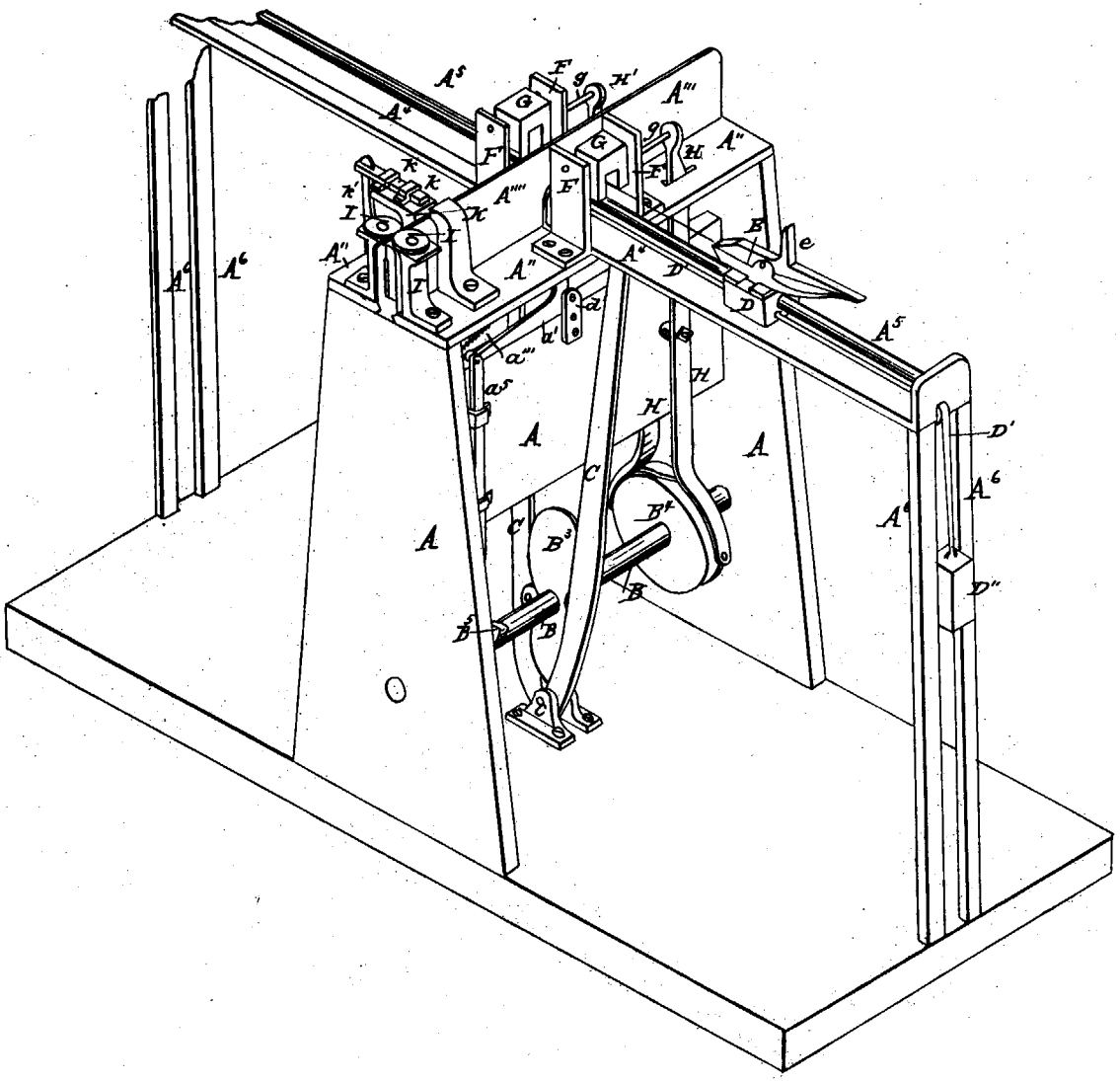
N. PETERS, Photo-Lithographer, Washington, D. C.

2 Sheets—Sheet 2.
I. I. GREENOUGH.
Sewing Machine.
No. 352. Reissued Feb. 12, 1856.
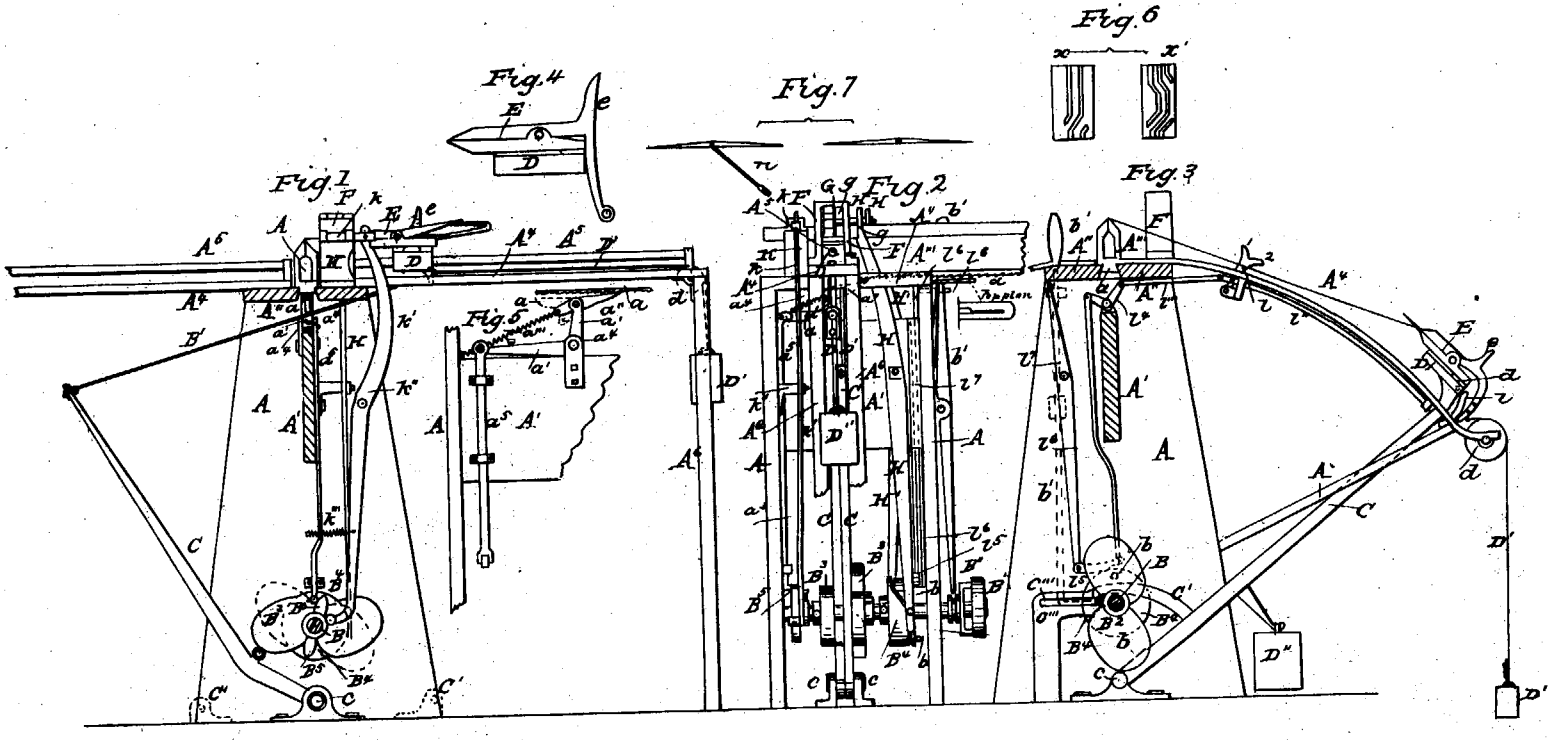
N. PETERS, Photo-Lithographer, Washington, D. C.

UNITED STATES PATENT OFFICE.

J. J. GREENOUGH, OF WASHINGTON, D. C., ASSIGNOR TO I. M. SINGER AND EDWARD CLARK, OF NEW YORK, N. Y.

IMPROVEMENT IN MACHINES FOR SEWING OR STITCHING STRAIGHT SEAMS.

Specification forming part of Letters Patent No. 2,466, dated February 21, 1842; Reissue No. 352, dated February 12, 1856.

*To all whom it may concern:*

Be it known that JAMES J. GREENOUGH, of Washington, D. C., did invent a new and useful Machine for Sewing or Stitching Leather, Cloth, or other Materials by Making a Seam with a Single or Double Thread; and we do hereby declare that the following is a full, clear, and exact description thereof, reference being had to the accompanying drawings, making a part of the same.

Drawing No. 1 is an isometrical view of the machine. Figure 1 is a vertical cross-section; Fig. 2, a side view; Fig. 3, a cross-section of a modification of the machine, together with the stop-motion; Fig. 4, a modification of the pinchers dispensing with the spring; Fig. 5, apparatus for spacing the stitches automatically; Fig. 6, diagrams of worm-wheels for the same purpose, being a substitute for the hand or pawl $a''$; Fig. 7, needles.

The same parts on the various figures are indicated by like letters.

The nature of this invention consists in a mode of automatically presenting articles to be stitched to the needles, so as to determine the length of stitch and cause the needles to be inserted at proper intervals, with regular spaces between; and, further, in the pinchers by which the needle is inserted and drawn through, together with the apparatus for operating the machine, forming altogether an automatic machine that feeds the article forward and sews a seam therein, as will be hereinafter more fully detailed in the following description of parts of the machine and its modifications.

The construction is as follows: A frame, of suitable material, may be made with two outside standards, A, connected by a brace, A'. On the top of these standards are fastened two ribs, A'' A'', beveled on their inner edges, between which the clamp A''', that holds the article to be sewed, plays. This clamp is formed of two jaws, between which the article to be sewed is pinched. To the center of each of the ribs A'' a guide, $A^4$, is fastened, extending out on each side at right angles to the ribs. These may be supported at their outer ends by standards $A^6$. The guides $A^4$ support rods $A^5$, on which the pinchers hereinafter named slide. A round horizontal shaft, B, has its bearings in the standards of the frame. On the end of this shaft a loose pulley, B', may be put, which connects with the driving-power, and is clutched by a common bayonet, B'', or other clutch, with the shaft B, worked by a spring-shipper, $b'$. At or near the center of the shaft B is placed one or more cams, $B^3$, projecting on each side of the shaft. On the same shaft is a wheel, $B^4$, around the periphery of which there is an eccentric groove, and at the opposite end of the shaft there is a cam, $B^5$, which we use for the purpose of moving the pricking-awl, and also to move the feeding apparatus. The cams are so formed as to give the proper motions, to be described, and their figure is clearly shown in the drawings. Below the shaft, at the base of the machine, are the fulcra of the arms C. These may be at the point shown in the drawings, at $c$ or at $c'$, (see dotted lines, Fig. 1,) as found most convenient. These arms extend up nearly to the ribs A'', and at the point on said arms opposite the shaft there is a friction-roller on each, against which the cam $B^3$ acts. Cords D' are attached to the upper ends of these arms, which cross under the ribs, and are connected with the slides D, by means of which said slides are drawn up to the clamp. Another cord extends from each slide D over a pulley, $d$, at the end of the guide, and down to a weight, D'', suspended to it. (For this weight a spring, in some cases, may be substituted.) A variation of this part of the machine is shown at Fig. 3, where the arm C has the piece D attached directly to it, the motion of the arms being in this case so changed as to reverse their action. When the spring-pinchers are used, the weight D* may be substituted for D''. Pinchers E are connected with pieces D, so as to point steadily toward the clamps; but they have a lateral motion when two needles are used, so as to seize one and the other alternately. The under half of the pinchers may have the end beyond the joint drawn into a spring, which bears against the upper half, so as to keep the jaws tightly pressed together, by which the needle is firmly gripped. Fig. 4 is a modification of the pinchers. To dispense with the springs, the lower half here only extends out to the joint. The upper half projects beyond and turns down at right angles. To the lower end of this the cord or strap that connects with the weight D″ is attached. (See also Fig. 3.) Frames F are attached to the ribs at the point where the guides join them. In these frames are slides G, that are called "shifters," under which the pinchers pass as they are made to come up to the center, and are thereby opened to release the needle after it has been inserted in the article to be wrought, when the shifter moves the pinchers laterally to bring it opposite the other needle, just inserted from the opposite side, the two shifters moving in opposite directions by means of a rod, *g*, running through the side of the frame, and attaching the shifters to the upper end of a lever, H or H′, moved by the wheel $B^4$, a stud on the end of the lever H H′ entering a groove on the periphery of wheel $B^4$, so formed as to make the required motion.

To feed along the article to be stitched, I form a rack on the under side of the clamp A‴, that holds the work on the upright arm of a bent lever, *a*′, (the arms of which are at right angles.) There is a pawl, *a*″, which is held up against the rack by a spring, *a*‴, which also serves to keep the bent lever back to its place. (Shown in dotted lines in Fig. 2, and the entire arrangement is delineated in Fig. 5.) The fulcrum of this lever is at $a^4$, and the outer end of the horizontal arm is attached to a rod, $a^5$, that is made to slide up and down by a cam, $B^5$. Instead of the above-described arrangement, an endless screw or worm-wheel may be so placed as to work into the rack on the clamp, the teeth of which are then made of proper form therefor. The thread of this wheel is so formed as to only move the clamp during a small part of its revolution. When the machine is required to "back-stitch," the thread of the screw has a backward turn, so as to cause the clamp to recede half the distance of its progression every other stitch, so that every other stitch is set back, as in ordinary "back-stitching." The form of the threads of these screws is shown in the diagrams Fig. 6, in which the screw is represented as laid out flat instead of being wrapped around the cylinder. *x* is the screw for stitching; *x*′, for back-stitching. This screw, the axis of which is parallel with the rack, can be driven in any proper and convenient way from the driving-shaft B. Two standards, I, are fastened to the front end of the ribs, on the top of which, and just level with the upper edge of the clamp, are two horizontal rollers, I′, between which the article to be sewed may pass. These rollers may be made to approach or recede from each other by means of screws, if necessary.

Between the rollers and the frames F, or in any other convenient position, an awl is placed, if the material to be worked is too thick to be pierced by the needles alone. The awl-holder *k* slides horizontally on top of a standard, K, near the level of the top of the clamp. The awl-holder *k* is moved by an upright lever, *k*′, that extends down and is actuated by the cam $B^5$. The fulcrum of this lever is at *k*″, and it is held against the cam by a spring, *k*‴. Fig. 7 is the needle to be used in this machine. It is made of steel or other suitable metal, gradually tapered from the center to a point at each end. At the center is drilled the eye, which may have a countersink and groove on one or both sides. A leader, *u*, made of small wire, may be used, if thought necessary, to prevent the thread from wearing too fast. This leader is riveted into the eye of the needle, so as to turn, and has an eye formed at its other end, into which the thread is drawn. When the machine is used with one needle, the pinchers are not required to move laterally, and only one is drawn back at a time, as will readily be perceived without further description.

The operation of the various parts is as follows: As the driving or cam shaft B revolves, the cam $B^3$ moves the arms C, so as to bring the pinchers up to the center, one a little in advance of the other. The pinchers enter between the projections on the shifters G and run the needle through the article under operation till the projection *e* strikes the top of the shifter and opens the jaws, thus relieving the needle. At this instant the groove on the wheel $B^4$ changes the lever H forward and H′ backward, which shifts the two pinchers to the opposite needles, at which time the arms C are released, and the weights draw back the pinchers, and with them the needles, to the length of the thread. While the thread is being drawn out, the feed apparatus is put into motion, and the clamp is carried forward the length of a stitch. The pricking-awl, if used, is then brought into operation, and the pinchers bring up the needles for another stitch.

The apparatus for stopping the machine is as follows: Near the outer end of the guide $A^4$, Fig. 3, is an upright lever, *q*, the fulcrum of which is on the guide. About two inches from the frame there is another lever, *l*′, the top of which is forked. The fulcrum of this lever is on a piece extending below the guide. These levers are connected by a rod, *l*″, which is attached to *l* below the fulcrum and to *l*′ above the fulcrum. To the inner end of this rod is jointed a connecting-wire, *l*‴, which couples it with the bell-crank $l^4$ on top of the cross-brace A′. From this bell-crank a cord extends down to a hook, $l^5$, on the lower extremity of a lever, $l^6$, nearly opposite the top of the wheel $B^4$, on the side of which there is a stud, *b*. Lever $l^6$ turns on a pivot, *l*′, and its upper end is turned to a right angle and passes horizontally through the standard. Beside the spring-shipper *b*′, on the side of piece D, is a pin, *d*′, (shown in dotted lines at Fig. 3, it being on the opposite side.) When the pinchers are drawn up to the center, the pin *d* strikes the arm 1 of the forked lever *l*′ and carries it forward sufficiently to bring the hook $l^5$ into range with the stud *b* on the wheel, and also to bring the arm 2 of the forked lever up, so as to be struck by pin *d* on its return. If the thread is so short as not to let the pinchers back far enough to strike this lever, the hook remains down in range with stud *b*, which, when it comes around, acts on the shipper by means of the lever *l* and stops the machine. If the thread breaks at any time during the operation, the arm is allowed to fall back so far that the pin *d* strikes the lever *l*, and this, it will be perceived, will have the same effect as leaving the forked arm forward.

What we claim as the invention of the said J. J. GREENOUGH, and which we desire to secure by Letters Patent, is—

1. The feeding of the article to be stitched automatically forward to the needles, so as to determine thereby the length of the stitch by means of the apparatus herein described, or any known mechanical equivalent therefor.

2. The employment of a weight or its equivalent to draw out the thread, substantially as herein described.

3. The combination of pinchers to draw the needles and thread through the article being sewed.

4. For the purpose of working with two needles at the same time, giving to the pinchers a simultaneous lateral movement to change the needles from one pair of pinchers to the other, as described.

5. The stop-motion consisting of an arrangement of apparatus described for stopping the machine when the thread breaks or becomes too short.

ISAAC M. SINGER.
EDWARD CLARK.

Witnesses:
HENRY E. MILFORD,
JAMES E. CLUTE.